United States Patent
Hironishi

(10) Patent No.: US 9,549,233 B2
(45) Date of Patent: Jan. 17, 2017

(54) TRANSMISSION DEVICE AND OPTICAL NETWORK SYSTEM

(71) Applicant: FUJITSU LIMITED, Kawasaki-shi, Kanagawa (JP)

(72) Inventor: Kazuo Hironishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/797,574

(22) Filed: Jul. 13, 2015

(65) Prior Publication Data
US 2016/0037241 A1 Feb. 4, 2016

(30) Foreign Application Priority Data

Aug. 4, 2014 (JP) ................................. 2014-158513

(51) Int. Cl.
*H04Q 11/00* (2006.01)
*H04B 10/572* (2013.01)
(Continued)

(52) U.S. Cl.
CPC ........ *H04Q 11/0066* (2013.01); *H04B 10/506* (2013.01); *H04B 10/572* (2013.01);
(Continued)

(58) Field of Classification Search
CPC ................ H04B 10/572; H04B 10/506; H04B 10/07955; H04B 10/077; H04B 10/00; H04J 14/0212; H04J 14/0227; H04Q 11/0066; H04Q 11/0005; H04Q 2011/0083; H04Q 2011/0016
See application file for complete search history.

(56) References Cited

U.S. PATENT DOCUMENTS 4,742,576 A 5/1988 McMahon
5,774,243 A 6/1998 Majima
(Continued)

FOREIGN PATENT DOCUMENTS

JP 62-159929 7/1987
JP 9-162849 6/1997
JP 9-252283 9/1997

OTHER PUBLICATIONS

M. Ohtsu et al., "Frequency Stabilisation of 1.5µm DFB Laser Using Internal Second Harmonic Generation and Atomic $^{87}$Rb Line", *Electronics Letters*, vol. 25 No. 1, pp. 22-23, Jan. 5, 1989.
(Continued)

*Primary Examiner* — Ted Wang
(74) *Attorney, Agent, or Firm* — Staas & Halsey LLP

(57) ABSTRACT

A transmission device includes: a wavelength-variable light source; a wavelength stabilized light source: a wavelength measuring device; a control circuit that controls the wavelength-variable light source; and a reception circuit that receives second reference wavelength light generated based on first reference wavelength light output from the wavelength stabilized light source whose wavelength stability is higher than that of the wavelength-variable light source, the control circuit calibrating the wavelength measuring device by using the second reference wavelength light, the control circuit calibrating the wavelength-variable light source by using the calibrated wavelength measuring device.

11 Claims, 15 Drawing Sheets

(51) Int. Cl.
*H04J 14/02* (2006.01)
*H04B 10/50* (2013.01)

(52) U.S. Cl.
CPC ...... *H04J 14/0212* (2013.01); *H04J 14/0227* (2013.01); *H04Q 11/0005* (2013.01); *H04Q 2011/0016* (2013.01); *H04Q 2011/0083* (2013.01)

(56) References Cited

U.S. PATENT DOCUMENTS

| | | | | |
|---|---|---|---|---|
| 5,949,562 A * | 9/1999 | Kubota | ............... | H04J 14/0224 398/79 |
| 6,507,404 B1 * | 1/2003 | Nishioki | ............... | G01J 9/0246 356/450 |
| 2013/0302029 A1 * | 11/2013 | Lee | ........................ | H04B 10/07 398/25 |

OTHER PUBLICATIONS

C. Svelte et al., "194 369 569.4(5) MHz Optical Frequency Standard Based on $^{13}C_2H_2P(16)$ Saturated Line", IEEE Instrumentation and Measurement Technology Conference, May 2002, pp. 69-72.

Y. C. Chung et al., "Frequency-Locking of a 1.5μm DFB Laser to an Atomic Krypton Line Using Optogalvanic Effect", *Electronics Letters* vol. 24 No. 16, Aug. 4, 1988, pp. 1048-1049.

Akira Mizutori et al., "Laser Diode Optical Frequency Stabilization by Employing Modulated Sideband Light", IEICE Trans., B vol. J94-B, No. 12, pp. 1538-1546, The Institute of Electronics, Information and Communication Engineers, 2011.

* cited by examiner

TRANSMISSION DEVICE AND OPTICAL NETWORK SYSTEM

CROSS-REFERENCE TO RELATED APPLICATION

This application is based upon and claims the benefit of priority of the prior Japanese Patent Application No. 2014-158513, filed on Aug. 4, 2014, the entire contents of which are incorporated herein by reference.

FIELD

The embodiments discussed herein are related to a transmission device and an optical network system including a plurality of transmission devices.

BACKGROUND

In recent years, modulation methods such as Super channel and Nyquist channel, whose frequency utilization efficiency is high, have been put into practical use. In an optical network in which a modulation method whose frequency utilization efficiency is high is used, interference may occur between light signals when wavelengths of the light signals are not appropriately adjusted. In this case, the quality of signals degrades and there is a risk that the bit error rate increases. Therefore, it is desired that the wavelengths of light signals (that is, the optical frequencies) are accurately adjusted in the optical network.

A wavelength selection switch that switches a path of a light signal for each wavelength in optical signal layer is introduced in nodes inside the optical network, so that a request for improving the wavelength accuracy is increased.

Related arts are disclosed in, for example, Japanese Laid-Open Patent Publication No. 62-159929, Japanese Laid-Open Patent Publication No. 09-162849, and Japanese Laid-Open Patent Publication No. 09-252283.

However, in the related arts, the wavelengths used in the optical network may not be accurately adjusted. It is possible to solve this problem by providing an accurate light source to each transmission device in the optical network. However, in this configuration, the cost to build the optical network increases.

SUMMARY

According to an aspect of the invention, a transmission device includes: a wavelength-variable light source; a wavelength stabilized light source: a wavelength measuring device; a control circuit that controls the wavelength-variable light source; and a reception circuit that receives second reference wavelength light generated based on first reference wavelength light output from the wavelength stabilized light source whose wavelength stability is higher than that of the wavelength-variable light source, the control circuit calibrating the wavelength measuring device by using the second reference wavelength light, the control circuit calibrating the wavelength-variable light source by using the calibrated wavelength measuring device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
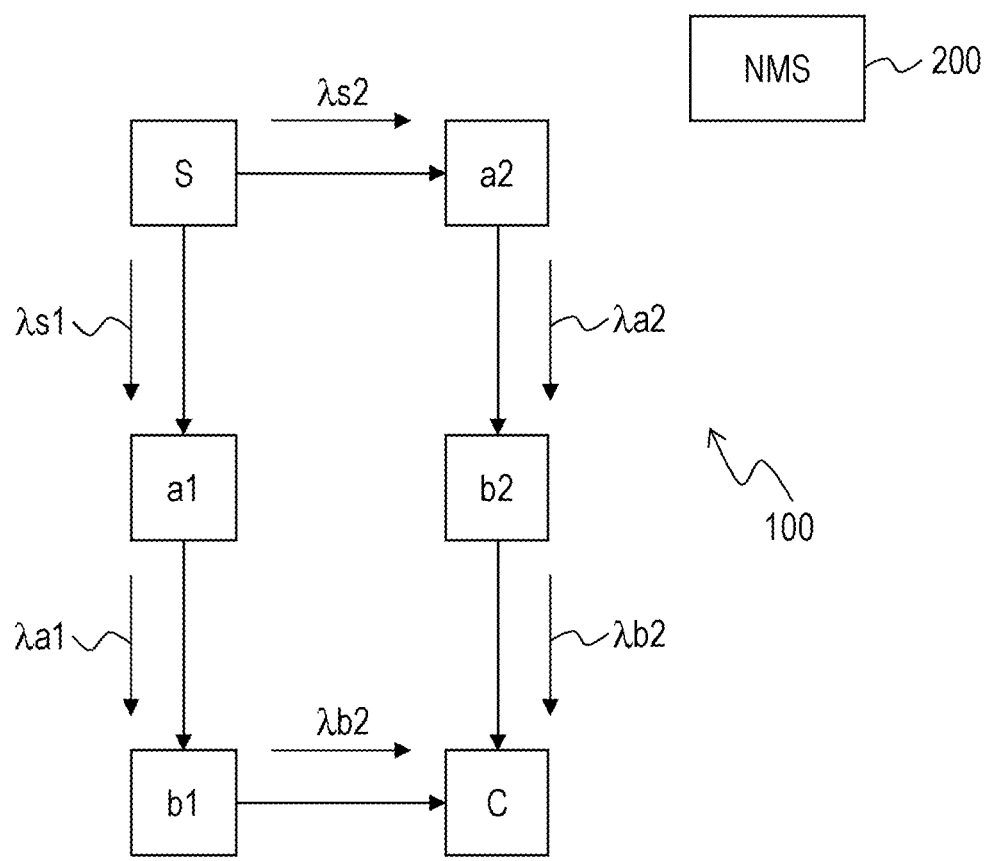
FIG. 1 is a diagram illustrating an example of an optical network system.

FIG. 1 illustrates an example of an optical network system according to an embodiment. As illustrated in FIG. 1, the optical network system 100 according to the embodiment includes a plurality of nodes (S, a1, a2, b1, b2, and c). A transmission device is provided to each node. In the description below, the transmission devices provided to the node S, the node a1, the node a2, the node b1, the node b2, and the node c may be respectively referred to as a transmission device S, a transmission device a1, a transmission device a2, a transmission device b1, a transmission device b2, and a transmission device c.

The optical network system 100 transmits a WDM signal. A light signal multiplexed on the WDM signal is disposed on, for example, an ITU-T frequency grid. It is possible to dispose light signals at 12.5 GHz intervals, 25 GHz intervals, 50 GHz intervals, or 100 GHz intervals on the ITU-T frequency grid. For example, the ITU-T frequency grid of 50 GHz intervals is represented by the following formula. Here, i is an integer including zero. Frequency=193.1+i×0.05 [THz]. In this case, for example, approximate nominal center wavelength=1552.5244 nm is obtained for i=0.

Figure 2:
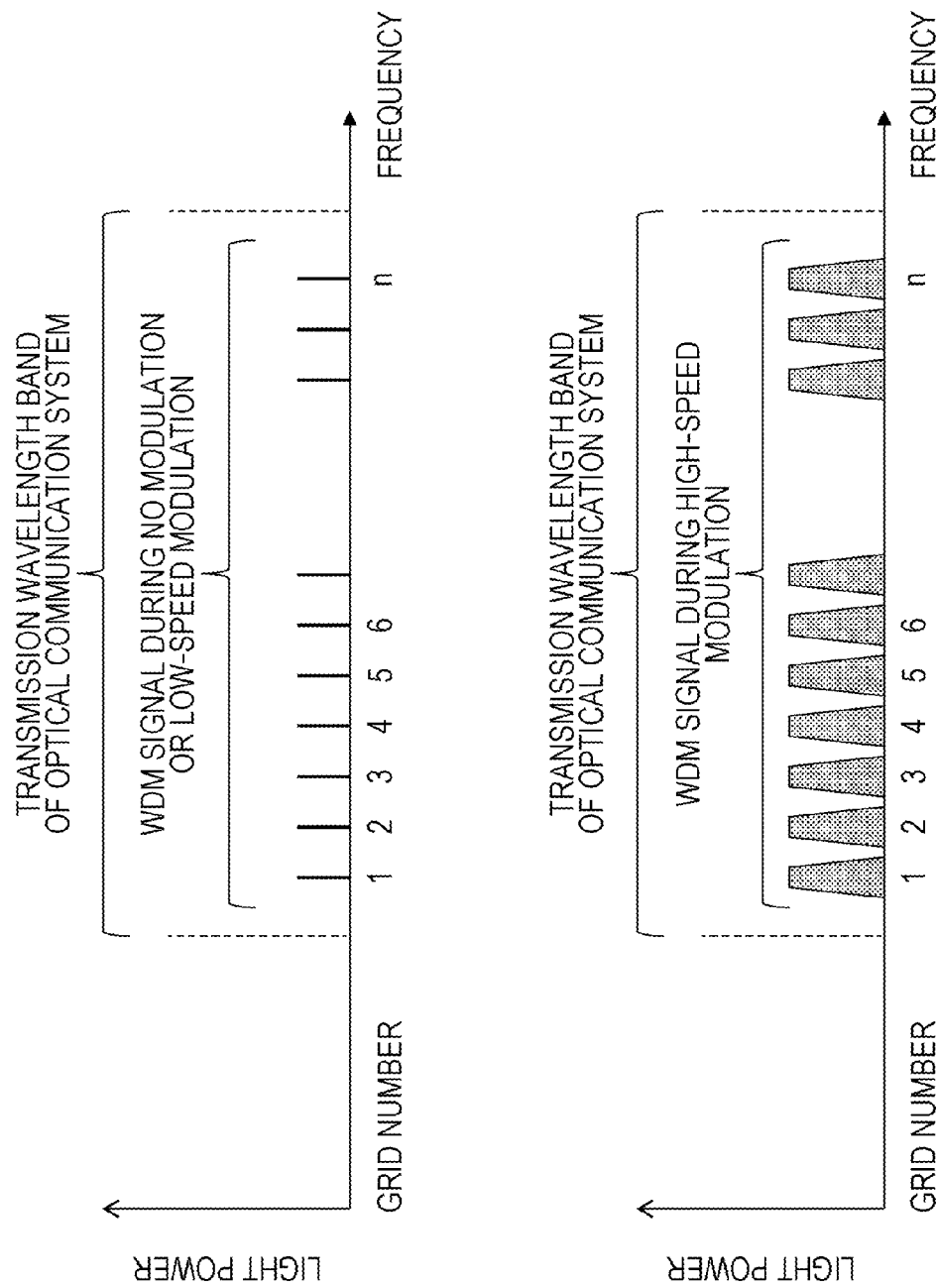
FIG. 2A is a diagram for explaining a WDM signal and a frequency grid during no modulation or low-speed modulation.
FIG. 2B is a diagram for explaining a WDM signal and a frequency grid during high-speed modulation.

As illustrated in FIGS. 2A and 2B, n wavelengths can be multiplexed on the WDM signal transmitted in the optical network system 100. FIG. 2A illustrates a WDM signal and a frequency grid during no modulation or low-speed modulation. FIG. 2B illustrates a WDM signal and a frequency grid during high-speed modulation. The high-speed modulation is modulation including transmission information (payload). Each light signal in the WDM signal normally includes transmission information higher than or equal to 2.5 Gb/s. The n wavelengths are disposed on the aforementioned ITU-T frequency grid in the embodiment. Each wavelength of the WDM signal is identified by a grid number 1 to n. In the description below, the frequency grid and a wavelength grid are not discriminated from each other.

Even in a frequency grid of frequency intervals different from those of the ITU-T frequency grid and a frequency grid of uneven frequency intervals, if the frequency grids can be quantitatively compared with the ITU-T frequency grid, the embodiment can be applied to these frequency grids.

The transmission device provided in each node of the optical network system 100 has a plurality of wavelength-variable light sources to generate and transmit a WDM signal. The wavelength-variable light sources of each transmission device are adjusted so that the light signals on the ITU-T frequency grid are transmitted. In other words, each transmission device adjusts each of the wavelength-variable light sources corresponding to a wavelength of each light signal so that the wavelengths of the light signals are accurately disposed on the ITU-T frequency grid.

A network management system (NMS) 200 manages the optical network system 100. Specifically, the network management system 200 can control the transmission device provided in each node. For example, the network management system 200 controls the transmission device provided in a corresponding node so as to set a path requested from a user. Further, the network management system 200 can relay control data transmitted between nodes. Although not particularly illustrated in the drawings, the network management system 200 is communicably connected to each transmission device.

In the optical network system 100 of the above configuration, the transmission device S has a wavelength stabilized light source whose wavelength stability is higher than that of the other light sources. Therefore, in the description below, the transmission device S may be referred to as a "stable transmission device" to differentiate from the other transmission devices.

It is possible to dispose a node other than the transmission device S, in a state in which the node has a function of the "stable transmission device" in a dormant state, as a backup of the transmission device S (that is, the stable transmission device) in the optical network. In this case, when a failure occurs in the optical network, the function of the "stable transmission device" is activated and used by the network management system (NMS) 200.

As described by Documents 1 to 3 below, the wavelength stability of the wavelength stabilized light source is realized by using wavelength characteristic of light absorption of molecular gas or atomic gas as a physical wavelength reference value. Document 1: M. Ohtsu and E. Ikegami, "FREQUENCY STABILISATION OF 1.5 µm DFB LASER USING INTERNAL SECOND HARMONIC GENERATION AND ATOMIC $^{87}$Rb LINE", *Electron. Lett*. Vol. 25 No. 1, pp. 22-23 (1989). Document 2: C. Svelte et al., "194 369 569.4(5) MHz Optical Frequency Standard Based on $^{13}C_2H_2P(16)$ Saturated Line", *IEEE Instrumentation and Measurement Technology Conference*, May 2002. Document 3: Y. C. Chung and C. B. Roxlo, "FREQUENCY-LOCKING OF A 1.5 µm DFB LASER TO AN ATOMIC KRYPTON LINE USING OPTOGALVANIC EFFECT", *Electron. Lett*. Vol. 24 No. 16, pp. 1048-1049 (1988).

The transmission device S calibrates the wavelength-variable light sources of the transmission device S by using the wavelength stabilized light source. In other words, the wavelength-variable light sources of the transmission device S are controlled to accurately generate a specified wavelength. The transmission device S transmits light of the specified wavelength to an adjacent node by using the calibrated wavelength-variable light source. In the example illustrated in FIG. 1, the transmission device S transmits light of wavelength $\lambda s1$ to the node a1 and transmits light of wavelength $\lambda s2$ to the node a2. The wavelength $\lambda s1$ is selected from wavelengths that are not used for communication between the node S and the node a1 and the wavelength $\lambda s2$ is selected from wavelengths that are not used for communication between the node S and the node a2. The wavelength $\lambda s1$ and the wavelength $\lambda s2$ may be equal to each other or may be different from each other.

As described above, the transmission device a1 receives the light of wavelength $\lambda s1$ from the transmission device S. Here, the wavelength $\lambda s1$ is generated by the wavelength-variable light source calibrated in the transmission device S. In other words, the wavelength of the light received by the transmission device a1 is accurately adjusted to $\lambda s1$ in the transmission device S. Therefore, the transmission device a1 calibrates the wavelength-variable light sources of the transmission device a1 by using the received light. Then, the transmission device a1 transmits light of a specified wavelength to an adjacent node by using the calibrated wavelength-variable light source. In the example illustrated in FIG. 1, the transmission device a1 transmits light of wavelength $\lambda a1$ to the node b1. At this time, the wavelength $\lambda a1$ is selected from wavelengths that are not used for communication between the node a1 and the node b1.

In the same manner, the transmission device of each node receives light generated by a calibrated wavelength-variable light source in another transmission device. Then, the transmission device calibrates the wavelength-variable light sources of the transmission device by using the received light. Therefore, the transmission device of each node can calibrate the wavelength-variable light sources of the transmission device. As a result, the wavelength of each light signal of the WDM signal is accurately disposed on the ITU-T frequency grid and the quality of the light signal is improved.

The transmission device c illustrated in FIG. 1 receives light of wavelength $\lambda b1$ from the node b1 and receives light of wavelength $\lambda b2$ from the node b2. In this case, the transmission device c may calibrate the transmission device c based on an average of a calibration value calculated by using the light of wavelength $\lambda b1$ and a calibration value calculated by using the light of wavelength $\lambda b2$.

In the example described above, one wavelength is used between nodes in order to calibrate the wavelength-variable light sources. However, the embodiment is not limited to this method. In other words, the wavelength-variable light sources may be calibrated by using a plurality of wavelengths between nodes. For example, the transmission device S transmits light of wavelength $\lambda s1\_s$ and light of wavelength $\lambda s1\_h$ to the node a1. The wavelength $\lambda s1\_s$ is specified from, for example, a region on the shorter wavelength side than the center wavelength of the wavelength band of the WDM signal. On the other hand, the wavelength $\lambda s1\_h$ is specified from, for example, a region on the longer wavelength side than the center wavelength of the wavelength band of the WDM signal. The transmission device a1 may calibrate the transmission device a1 based on an average of a calibration value calculated by using the light of wavelength $\lambda s1\_s$ and a calibration value calculated by using the light of wavelength λs1_h. According to this method, the calibration accuracy of the wavelength-variable light sources is improved.

As described above, in the optical network system 100, it is possible to adjust wavelengths at a high degree of accuracy in each node without providing a light source with high wavelength stability to each node. Therefore, it is possible to generate accurate wavelengths at a low cost over the entire optical network system. The wavelength-variable light sources are adjusted by using a wavelength channel that is not used between each node, so that it is not desired to provide a dedicated wavelength channel to calibrate the wavelength-variable light sources. Therefore, resources (here, wavelengths) of the WDM system are effectively used.

Figure 3:
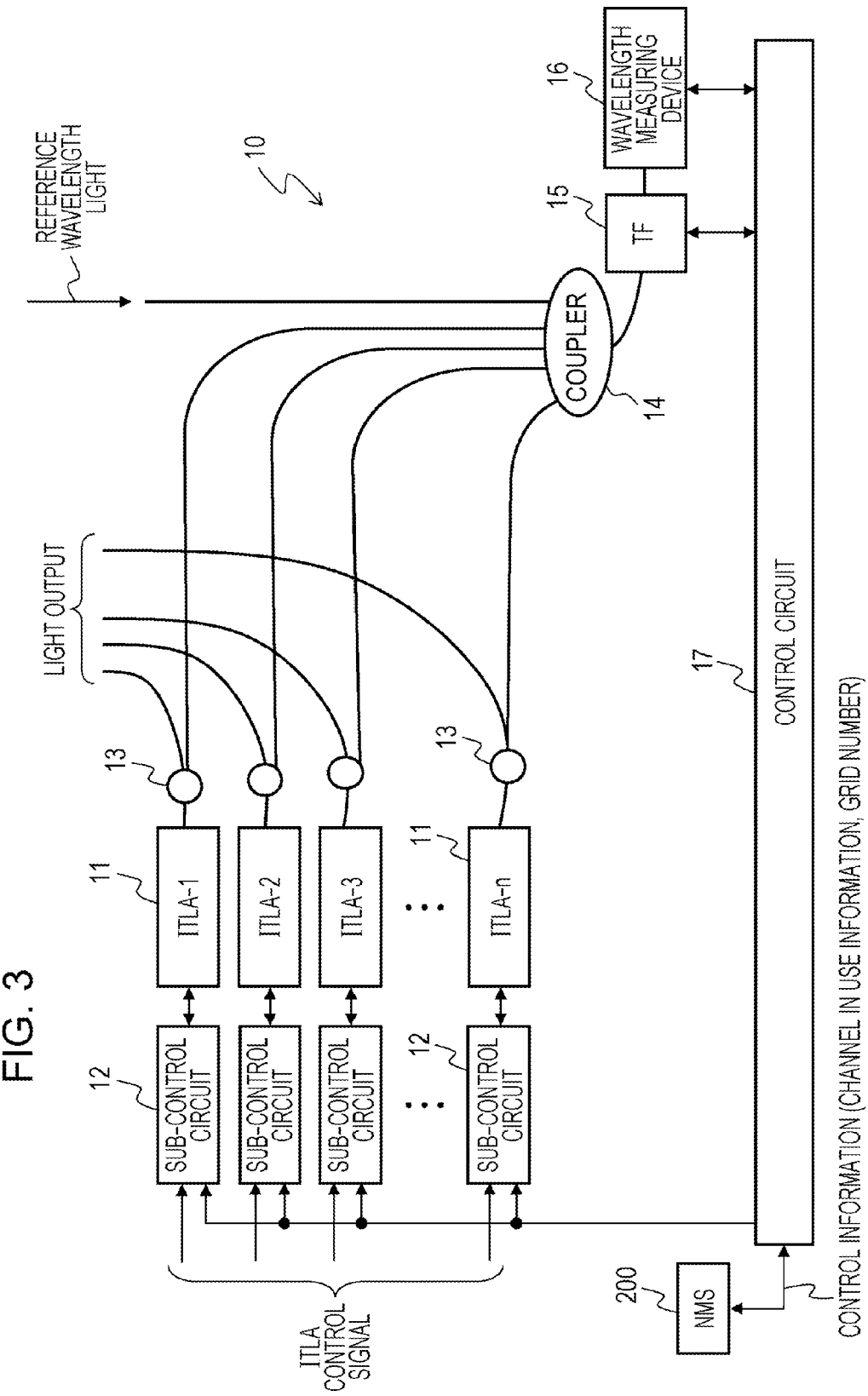
FIG. 3 is a diagram illustrating an example of a light transmission circuit.

FIG. 3 illustrates an example of a light transmission circuit 10 according to the embodiment. The light transmission circuit 10 is mounted in the transmission device provided in each node. The light transmission circuit 10 includes a plurality of wavelength-variable laser light sources (Integrable Tunable Laser Assemblies: ITLAs) 11, a plurality of sub-control circuits 12, a plurality of optical splitters 13, an optical coupler 14, a variable optical filter (TF) 15, a wavelength measuring device 16, and a control circuit 17.

Regarding a signal line between the control circuit 17 and each sub-control circuit 12, a separate signal line may be provided for each sub-control circuit 12. Regarding the wiring described above, the same goes for FIGS. 4, 6, 11, and 15 described later.

The wavelength-variable laser light source 11 generates light of a specified wavelength according to control of the control circuit 17 and a corresponding sub-control circuit 12. The sub-control circuit 12 controls a corresponding wavelength-variable laser light source 11 according to an ITLA control signal. The ITLA control signal is generated based on, for example, an instruction given from the network management system 200 and specifies a grid number. In this case, the sub-control circuit 12 controls the wavelength-variable laser light source 11 so as to generate light of wavelength corresponding to the specified grid number. Further, the sub-control circuit 12 can adjust the wavelength of the light generated by a corresponding wavelength-variable laser light source 11 according to an instruction from the control circuit 17.

The optical splitter 13 splits light output from a corresponding wavelength-variable laser light source 11 and guides the split light to the optical coupler 14. The optical coupler 14 couples light output from the wavelength-variable laser light sources (ITLA-1 to ITLA-n) 11. When the transmission device receives reference wavelength light from an adjacent node, the optical coupler 14 couples light output from the wavelength-variable light sources and the reference wavelength light. Although described later, the reference wavelength light illustrated in FIG. 3 is generated by another transmission device.

The variable optical filter 15 extracts light of wavelength specified by the control circuit 17 from light output from the optical coupler 14. The wavelength measuring device 16 measures the wavelength of the light extracted by the variable optical filter 15.

The control circuit 17 receives control information from the network management system 200 and transmits control information to the network management system 200. Further, the control circuit 17 calibrates the wavelength measuring device 16 and the wavelength-variable laser light sources 11.

Figure 4:
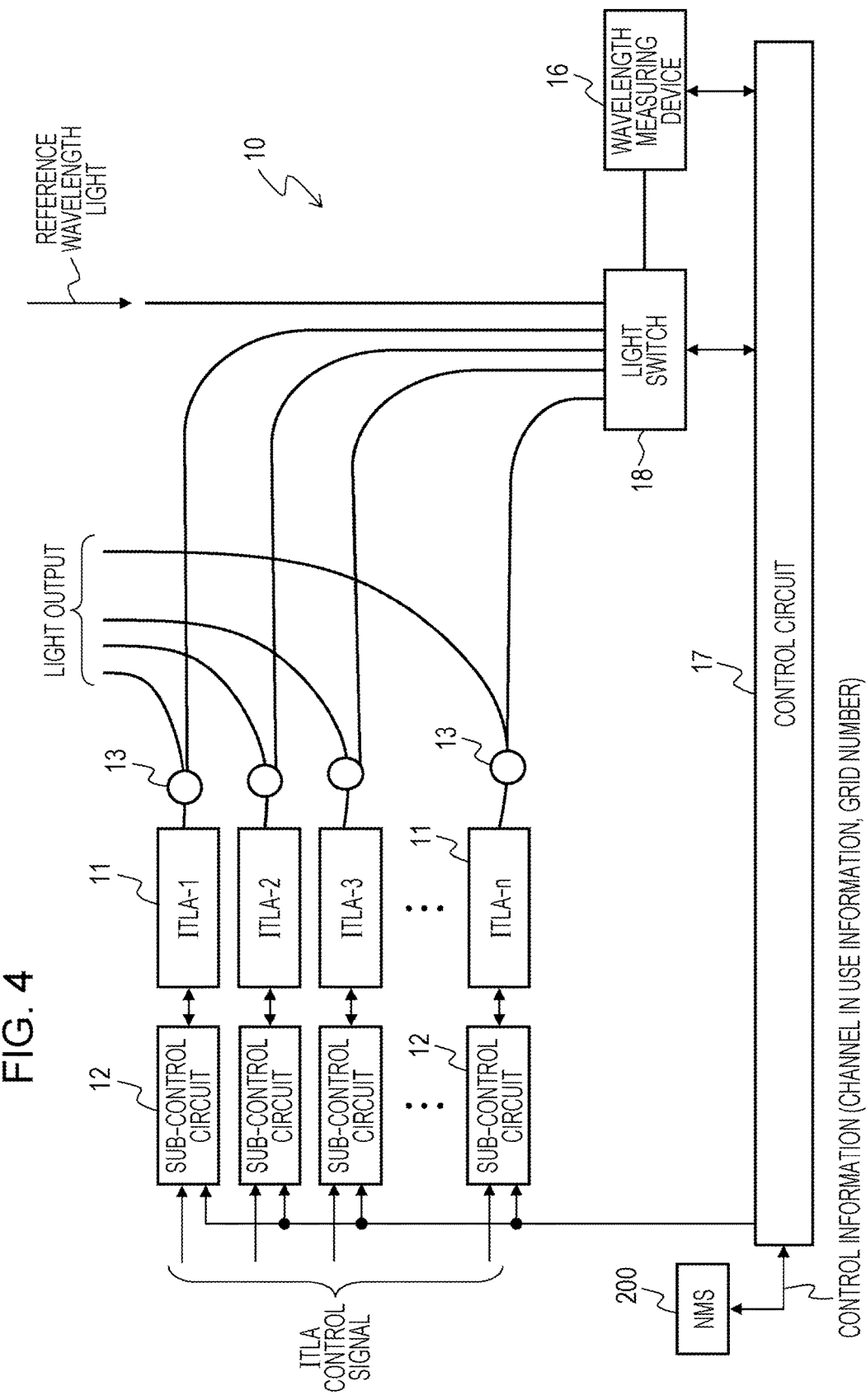
FIG. 4 is a diagram illustrating a variation of the light transmission circuit.
Figure 5:
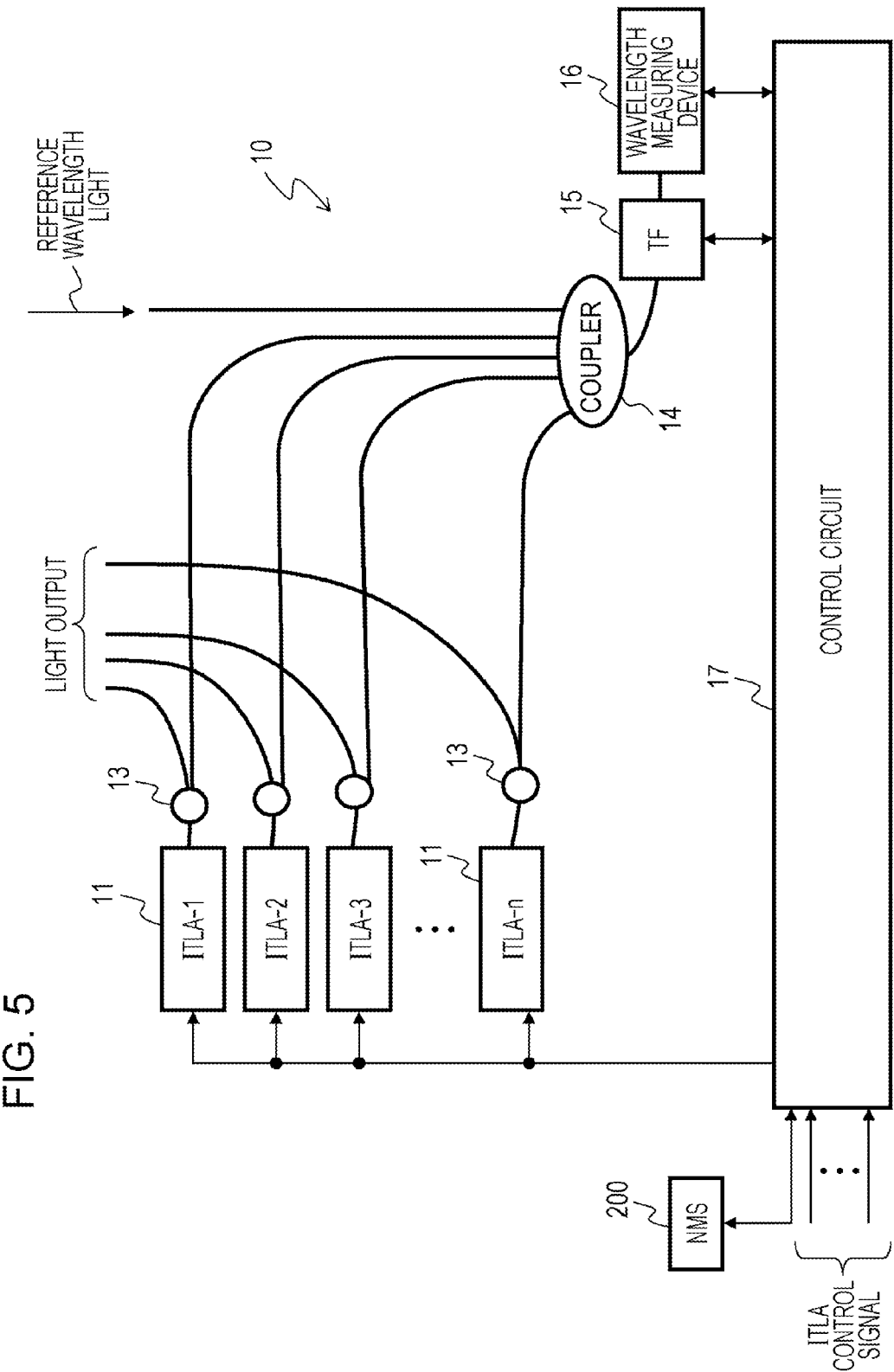
FIG. 5 is a diagram illustrating another variation of the light transmission circuit.

The configuration of the light transmission circuit 10 is not limited to the practical example illustrated in FIG. 3. For example, the circuit that selects a specified wavelength (in FIG. 3, the optical coupler 14 and the variable optical filter 15) may be realized by a light switch 18 as illustrated in FIG. 4. The light switch 18 selects light input through a port specified by the control circuit 17. The control circuit 17 may provide the function of the sub-control circuit 12. In this case, as illustrated in FIG. 5, the control circuit 17 controls each wavelength-variable laser light source 11.

Figure 6:
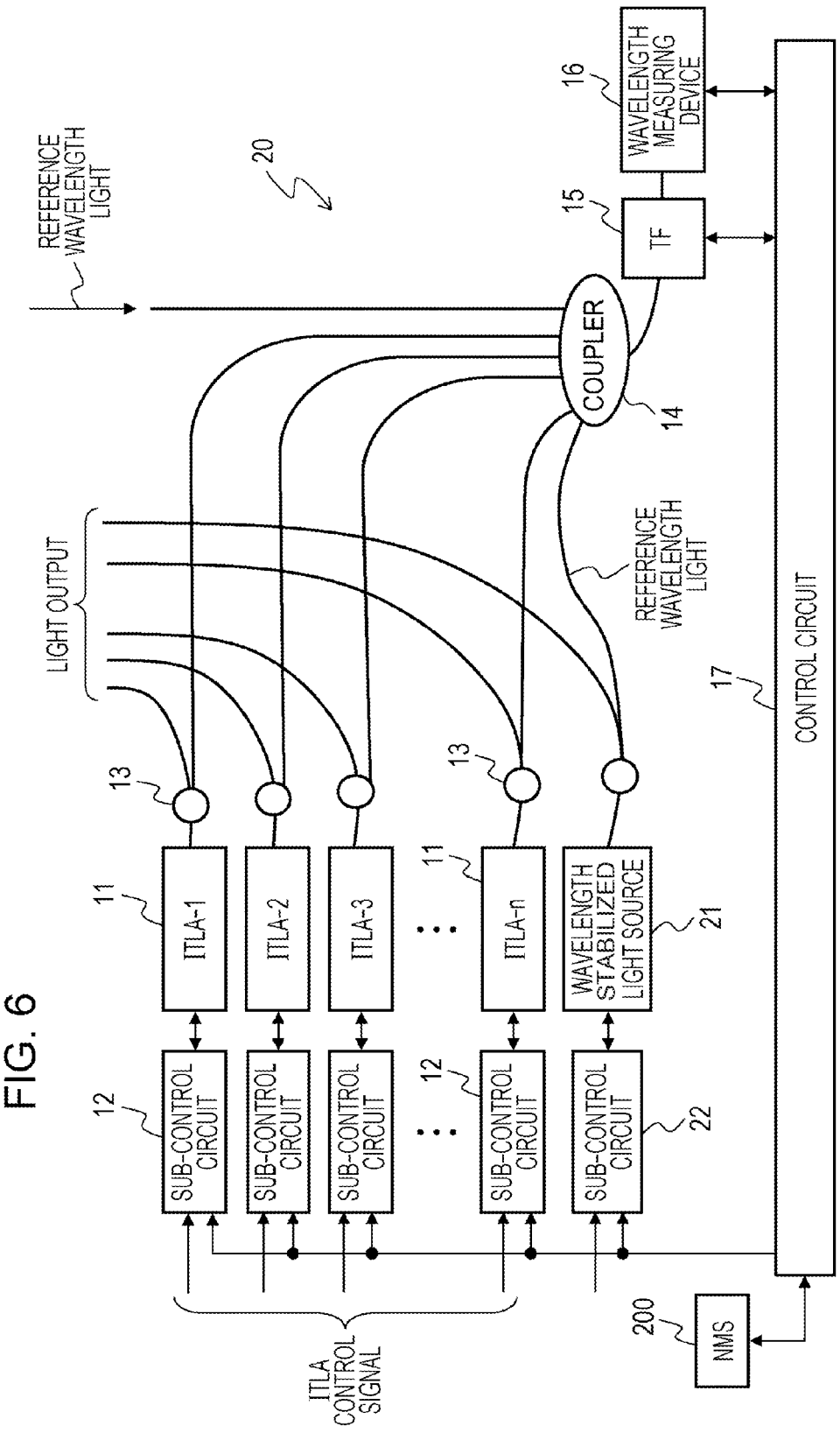
FIG. 6 is a diagram illustrating an example of a light transmission circuit mounted in a stable transmission device.

FIG. 6 illustrates an example of a light transmission circuit 20 mounted in the stable transmission device. In the example illustrated in FIG. 1, the light transmission circuit 20 is mounted in the transmission device S. The light transmission circuit 20 includes a wavelength stabilized light source 21 and a sub-control circuit 22 in addition to the wavelength-variable laser light sources 11, the sub-control circuits 12, the optical splitters 13, the optical coupler 14, the variable optical filter 15, the wavelength measuring device 16, and the control circuit 17, which are illustrated in FIG. 3.

The wavelength stabilized light source 21 is a laser light source having wavelength stability higher than that of the wavelength-variable laser light sources 11. Specifically, the wavelength stabilized light source 21 can generate light of more stable wavelength with respect to temperature change and passage of time as compared with the wavelength-variable laser light sources 11. The wavelength stabilized light source 21 is, for example, a fixed wavelength light source. In this case, the light transmission circuit 20 does not have to include the sub-control circuit 22. However, the wavelength stabilized light source 21 may be a wavelength-variable light source. In this case, the wavelength of the wavelength stabilized light source 21 is controlled by the control circuit 17 and the sub-control circuit 22.

Although the light transmission circuit 20 illustrated in FIG. 6 has a configuration similar to that of the light transmission circuit 10 illustrated in FIG. 3, the embodiment is not limited to this configuration. For example, the light transmission circuit 20 may be realized by a configuration similar to that of the light transmission circuit 10 illustrated in FIG. 4 or 5. In FIG. 5, regarding a signal line between the control circuit 17 and each wavelength-variable laser light source 11, a separate signal line may be provided for each wavelength-variable laser light source 11.

Figure 7:
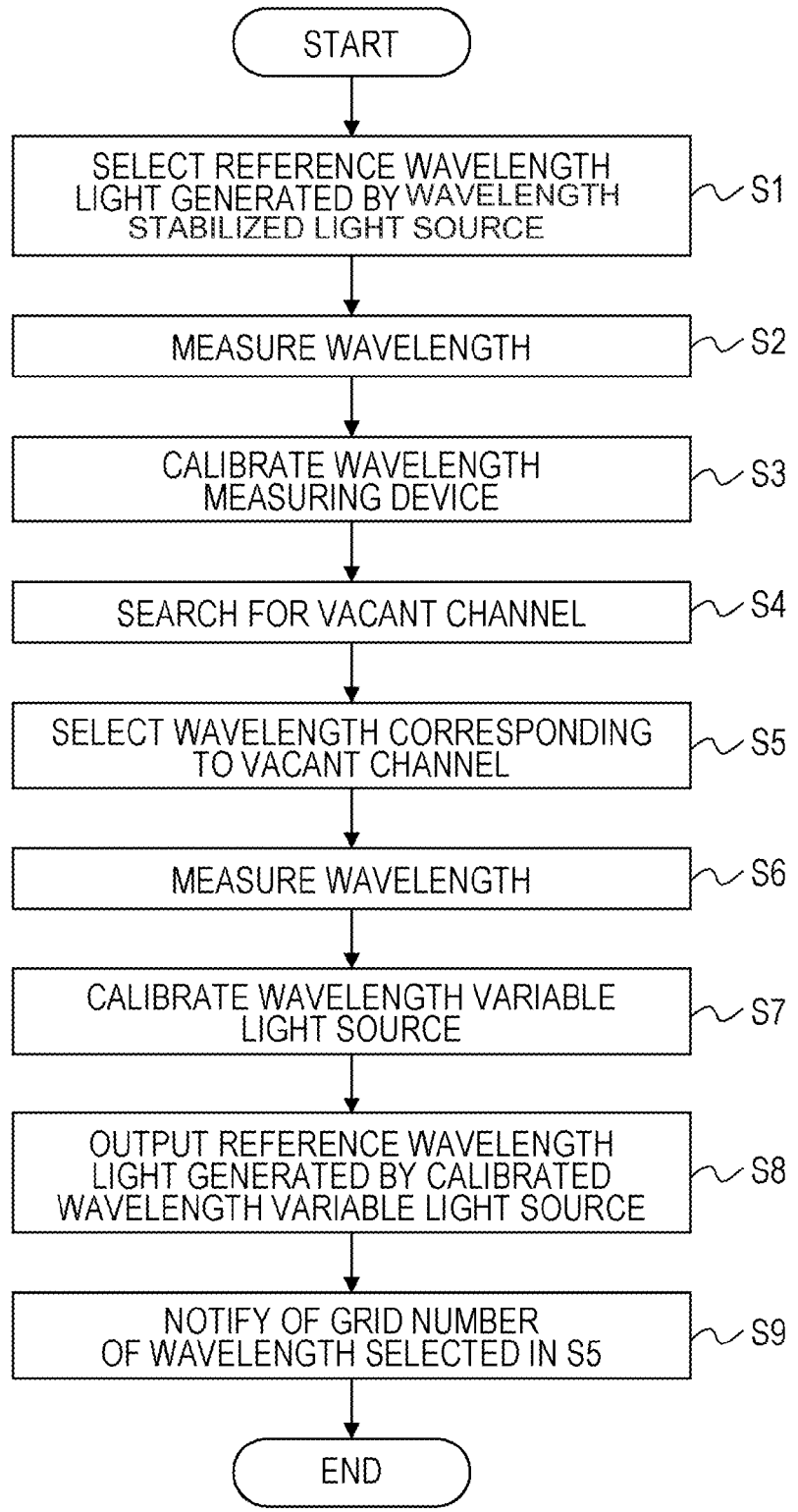
FIG. 7 is a flowchart illustrating processing of the light transmission circuit of the stable transmission device.

FIG. 7 is a flowchart illustrating processing of the light transmission circuit 20 of the stable transmission device. For example, this processing is performed when an instruction to start wavelength adjustment processing of the optical network system 100 is given. Hereinafter, an operation of the light transmission circuit 20 illustrated in FIG. 6 will be described.

In S1, the control circuit 17 gives an instruction to the variable optical filter 15 so as to select the reference wavelength light generated by the wavelength stabilized light source 21. As a result, the reference wavelength light generated by the wavelength stabilized light source 21 is guided to the wavelength measuring device 16. It is assumed that the wavelength stabilized light source 21 generates reference wavelength light of a predetermined wavelength.

In S2, the wavelength measuring device 16 measures the wavelength of the reference wavelength light generated by the wavelength stabilized light source 21. However, at this time point, the wavelength measuring device 16 may not necessarily correctly measure the wavelength of input light. In other words, a measurement result of the wavelength measuring device 16 may include an error. For example, when the wavelength of the reference wavelength light is λref, the wavelength measuring device 16 outputs "Measurement result=λref+Δλ".

In S3, the control circuit 17 calibrates the wavelength measuring device 16. Here, it is assumed that the control circuit 17 knows the wavelength λref of the reference wavelength light generated by the wavelength stabilized light source 21. The control circuit 17 obtains a calibration value Δλ by calculating a difference between the measurement result of the wavelength measuring device 16 and the wavelength λref. Thereafter, the control circuit 17 can correct the measurement result of the wavelength measuring device 16 by using the calibration value Δλ.

Here, when the measurement result of the wavelength measuring device 16 is corrected by the calibration value Δλ in the control circuit 17, the wavelength data obtained by the correction accurately represents the wavelength of the light input to the wavelength measuring device 16. Therefore, the processing for correcting the measurement result of the wavelength measuring device 16 by using the calibration value Δλ is equivalent to the processing for correcting the wavelength measuring device 16. In other words, the processing for correcting the measurement result of the wavelength measuring device 16 by using the calibration value Δλ in the control circuit 17 is an example of the processing for correcting the wavelength measuring device 16. However, the wavelength measuring device 16 may be calibrated by another method. For example, operation conditions of the wavelength measuring device 16 (such as an applied voltage and temperature) may be adjusted so that the measurement result of the wavelength measuring device 16 is output in a state in which the measurement result is corrected by the calibration value Δλ.

In S4, the control circuit 17 searches for a vacant channel that is not used for communication with an adjacent node. It is assumed that the allocation of each channel of the WDM signal is determined by, for example, the network management system 200 and is notified to the transmission device of each node. Thereafter, the control circuit 17 can search for a vacant channel based on the notification. Alternatively, the network management system 200 may search for a vacant channel and the network management system 200 may notify the control circuit 17 of the vacant channel as vacant channel information. Hereinafter, a wavelength corresponding to the vacant channel may be referred to as "λi". Further, the wavelength-variable laser light source 11 that generates light of wavelength λi may be referred to as a "wavelength-variable laser light source 11*i*". When a vacant channel has not been searched by the control circuit, the control circuit is possible to assign a narrow bandwidth channel where a wavelength is set in an end wavelength region of a transmission wavelength band of the optical communication system.

In S5, the control circuit 17 gives an instruction to the variable optical filter 15 so as to select the wavelength λi corresponding to the vacant channel. In other words, the control circuit 17 gives an instruction to the variable optical filter 15 so as to select light output from the wavelength-variable laser light source 11*i*. As a result, the light of wavelength λi generated by the wavelength-variable laser light source 11*i* is guided to the wavelength measuring device 16.

In S6, the wavelength measuring device 16 measures the wavelength of the light generated by the wavelength-variable laser light source 11*i*. In S7, the control circuit 17 calibrates the wavelength-variable laser light source 11*i* by using a measurement result of S6 and the aforementioned calibration value Δλ. Specifically, the control circuit 17 shifts the oscillation wavelength of the wavelength-variable laser light source 11*i* by the calibration value Δλ. It is assumed that the oscillation wavelength of the wavelength-variable laser light source 11*i* can be adjusted by controlling, for example, the applied voltage and the temperature.

In S8, the light transmission circuit 20 outputs light generated by the calibrated wavelength-variable laser light source 11*i*. The light generated by the calibrated wavelength-variable laser light source 11*i* is used by an adjacent node as the reference wavelength light. Further, in S9, the control circuit 17 notifies the network management system 200 of the grid number selected in S5 (that is, the grid number i of the light generated by the wavelength-variable laser light source 11*i*).

In this way, in the light transmission circuit 20 of the stable transmission device, the wavelength measuring device 16 is calibrated by using the reference wavelength light generated by the wavelength stabilized light source 21 and the wavelength-variable laser light source 11 is calibrated by using the calibrated wavelength measuring device 16. Therefore, the light transmission circuit 20 can accurately adjust the wavelength of a desired wavelength channel.

Figure 8:
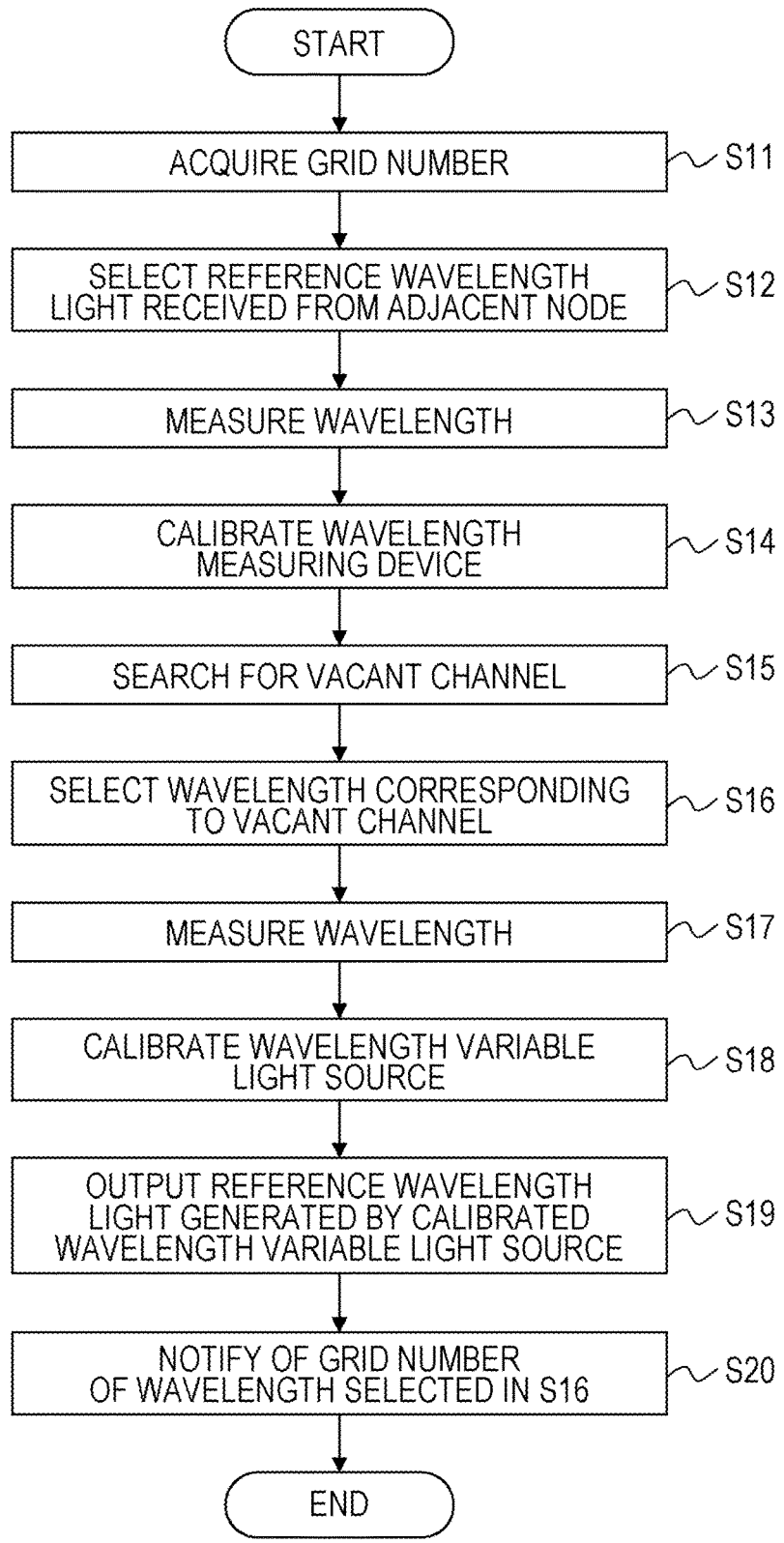
FIG. 8 is a flowchart illustrating processing of a light transmission circuit provided in each node.

FIG. 8 is a flowchart illustrating processing of the light transmission circuit 10 of the transmission device provided in each node. In the description of the flowchart illustrated in FIG. 8, the "transmission device provided in each node" means a transmission device other than the stable transmission device. Hereinafter, an operation of the light transmission circuit 10 illustrated in FIG. 3 will be described.

It is assumed that the light transmission circuit 10 receives the reference wavelength light from an adjacent node. For example, the reference wavelength light is generated by the stable transmission device according to the flowchart illustrated in FIG. 7. In the example illustrated in FIG. 1, the light transmission circuit 10 mounted in the node a1 receives the reference wavelength light λs1 from the transmission device S. Alternatively, the reference wavelength light is generated when another transmission device performs the processing of the flowchart illustrated in FIG. 8. In the example illustrated in FIG. 1, the light transmission circuit 10 mounted in the node b1 receives the reference wavelength light λa1 from the transmission device a1.

In S11, the control circuit 17 acquires the grid number from the network management system 200. The grid number is notified from a transmission source node of the reference wavelength light to the network management system 200 (see S9 in FIG. 7). In other words, the grid number represents a grid number where the received reference wavelength light is disposed.

In S12, the control circuit 17 gives an instruction to the variable optical filter 15 so as to select the reference wavelength light received from an adjacent node. As a result, the reference wavelength light received from the adjacent node is guided to the wavelength measuring device 16.

S13 to S20 are substantially the same as S2 to S9 illustrated in FIG. 7. Specifically, in the light transmission circuit 10, the wavelength measuring device 16 is calibrated by using the reference wavelength light received from an adjacent node and the wavelength-variable laser light source 11 is calibrated by using the calibrated wavelength measuring device 16. In S19, the light transmission circuit 10 outputs the reference wavelength light to an adjacent node by using the calibrated wavelength-variable laser light source 11.

The transmission device provided in each node of the optical network system 100 performs the processing of the flowchart illustrated in FIG. 8. Therefore, the reference wavelength light generated by the calibrated wavelength-variable laser light source 11 is sequentially propagated to each node and finally the reference wavelength light is given to all the nodes.

However, the transmission device may receive the reference wavelength light from a plurality of adjacent nodes depending on a position in the network. For example, in the optical network system 100 illustrated in FIG. 1, the transmission device c receives the reference wavelength light (λb1 and λb2) from both nodes b1 and b2. In this case, the light transmission circuit 10 calibrates the wavelength measuring device 16 by using the reference wavelength light received from each node.

Figure 9:
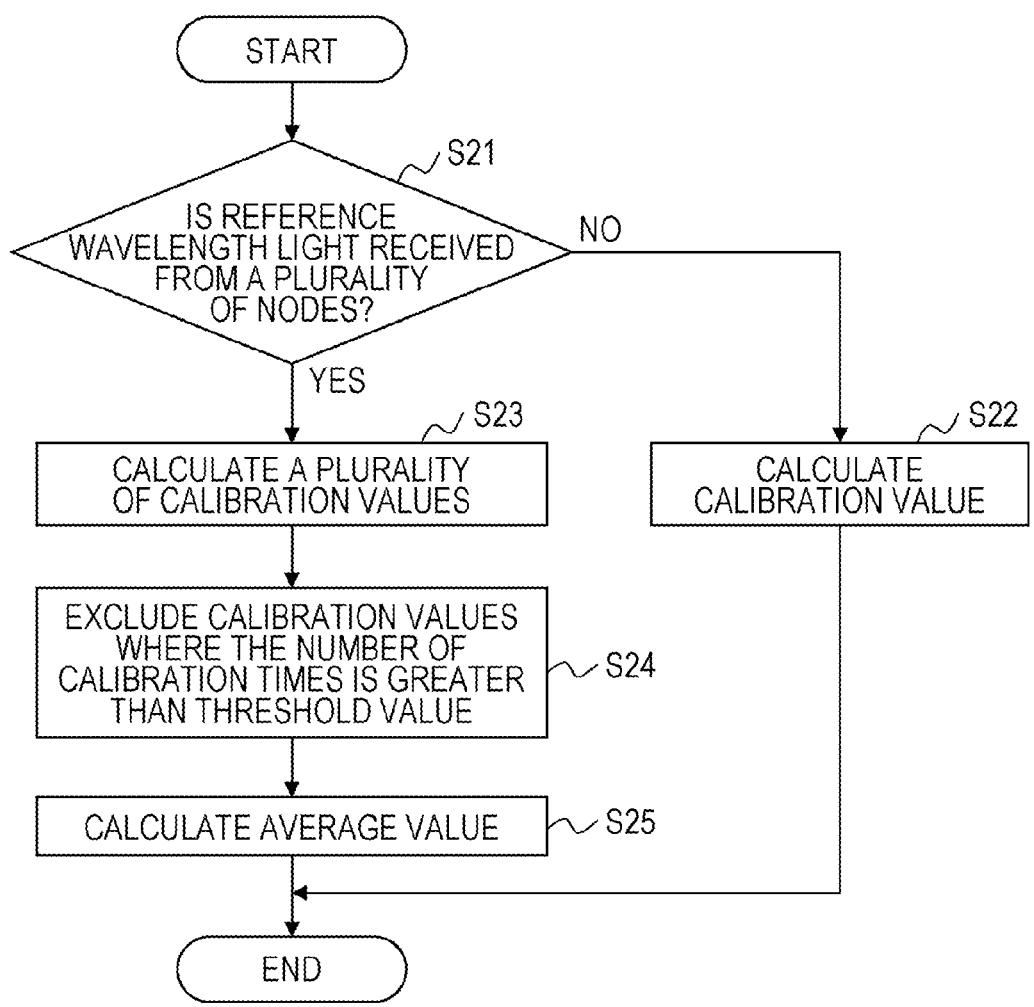
FIG. 9 is a flowchart illustrating an example of a method for calibrating a wavelength measuring device.

FIG. 9 is a flowchart illustrating an example of a method for calibrating the wavelength measuring device. This flowchart is a practical example of S14 illustrated in FIG. 8. When the light transmission circuit 10 receives the reference wavelength light from each of a plurality of nodes, the control circuit 17 receives the grid numbers corresponding to each reference wavelength light in S11. In S13, the wavelength measuring device 16 measures the wavelengths of each reference wavelength light.

In S21, the control circuit 17 determines whether or not the reference wavelength light is received from each of a plurality of adjacent nodes. When the reference wavelength light is received from only one adjacent node, the control circuit 17 calculates the calibration value Δλ based on the measurement result of the wavelength of the reference wavelength light in S22. On the other hand, when the reference wavelength light is received from each of a plurality of adjacent nodes, the control circuit 17 performs S23 to S25.

In S23, the control circuit 17 calculates the calibration values Δλ1, Δλ2, and so on for the reference wavelength light received from each adjacent node. In S24 and S25, the control circuit 17 obtains the calibration value Δλ used in calibration processing by calculating an average of the plurality of calibration values Δλ1, Δλ2, and so on.

However, the reference wavelength light received from an adjacent node is generated after the calibration processing is performed once or more. For example, in the optical network system 100 illustrated in FIG. 1, the reference wavelength light λs1 output from the transmission device S is generated after the calibration processing is performed in the transmission device S. The reference wavelength light λa1 output from the transmission device a1 is generated after the calibration processing is performed in the transmission device S and the transmission device a1. The reference wavelength light λb1 output from the transmission device b1 is generated after the calibration processing is performed in the transmission device S, the transmission device a1, and the transmission device b1. However, when the number of times of the calibration processing increases, the calibration errors are accumulated. In other words, when the calibration value is calculated by using the reference wavelength light generated after the calibration processing is performed in many nodes, the reliability of the calibration value is low. Therefore, in the average calculation in S24 and S25, it is preferable to exclude the calibration values for which the calibration is performed the number of times that is greater than a predetermined threshold value.

In the practical example illustrated in FIG. 8, the light transmission circuit 10 generates new reference wavelength light based on the received reference wavelength light. However, the embodiment is not limited to this configuration. In other words, the light transmission circuit 10 does not have to generate new reference wavelength light based on the received reference wavelength light.

Figure 10:
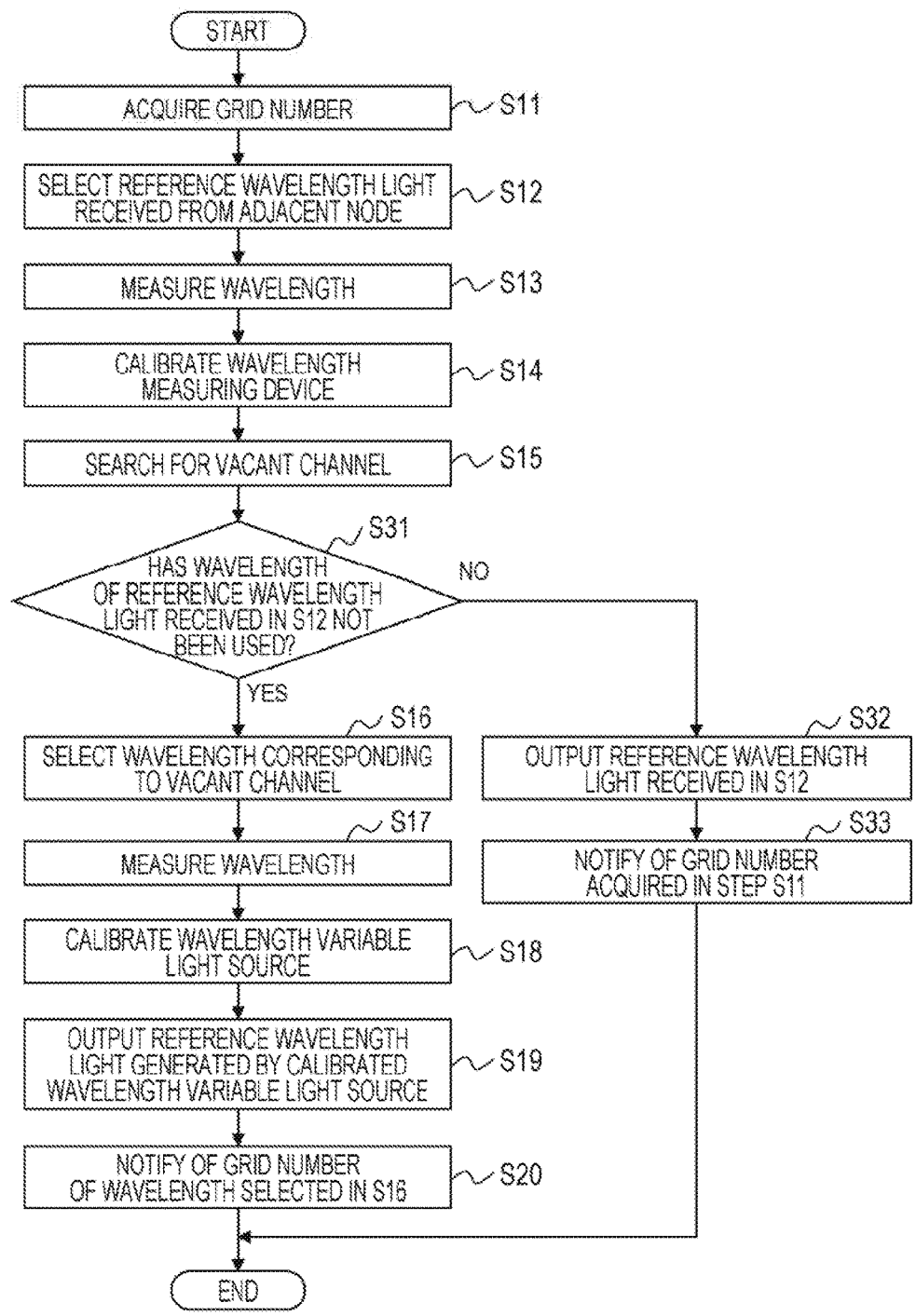
FIG. 10 is a flowchart illustrating a variation of a procedure illustrated in FIG. 8.

FIG. 10 is a flowchart illustrating a variation of the procedure illustrated in FIG. 8. S11 to S15 and S16 to S20 in FIG. 10 are substantially the same as those in FIG. 8.

In a practical example illustrated in FIG. 10, S31 is performed following S15. Specifically, the control circuit 17 determines whether or not the wavelength of the reference wavelength light received in S12 is used for communication with a transmission destination adjacent node. When the wavelength is used for communication with a transmission destination adjacent node, the control circuit 17 performs S16 to S20 in order to generate new reference wavelength light. On the other hand, when the wavelength of the reference wavelength light received in S12 is not used for communication with a transmission destination adjacent node, the control circuit 17 transmits the reference wavelength light to the adjacent node in S32. In S33, the control circuit 17 notifies the network management system 200 of the grid number acquired in S11. According this configuration, it is possible to reduce the number of times of the calibration performed in each node, so that the degree of accuracy of the reference wavelength light is improved in the optical network system 100.

Figure 11:
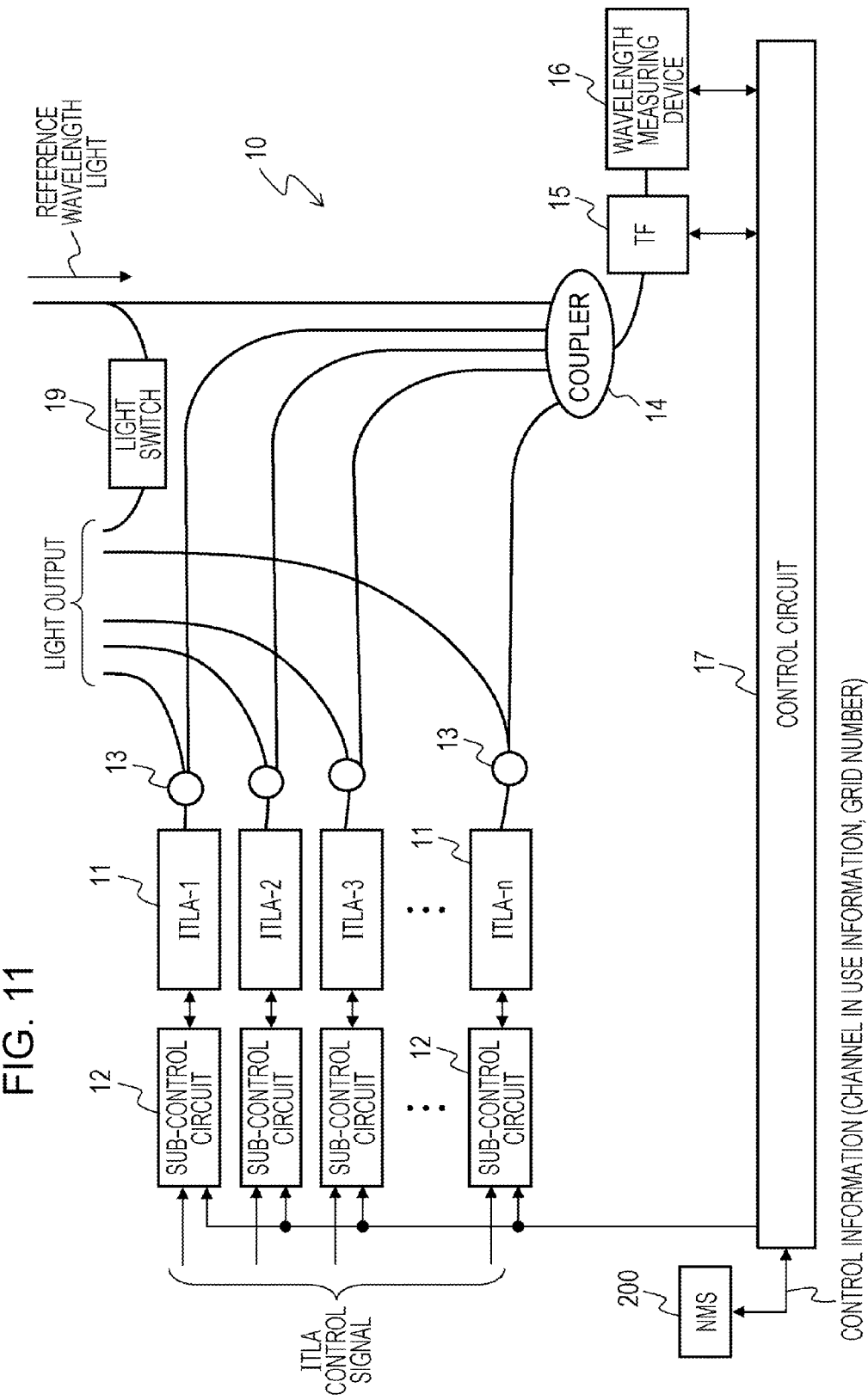
FIG. 11 is a diagram illustrating a configuration for implementing a procedure illustrated in FIG. 10.

To implement the procedure of the practical example illustrated in FIG. 10, the light transmission circuit 10 has, for example, a light switch 19 as illustrated in FIG. 11. In this case, when the wavelength of the received reference wavelength light is not used for communication with a transmission destination adjacent node, the light switch 19 guides the received reference wavelength light to an output port.

In the practical example described above, the light transmission circuits 10 and 20 transmit the reference wavelength light of a certain one wavelength to an adjacent node. However, the embodiment is not limited to this configuration. For example, the light transmission circuits 10 and 20 may transmit a set of reference wavelength light to an adjacent node. In this case, it is preferable that the light transmission circuits 10 and 20 transmit short-wavelength reference wavelength light and long-wavelength reference wavelength light to an adjacent node. Here, the "short-wavelength" means a wavelength shorter than the center wavelength of the WDM signal band and the "long-wavelength" means a wavelength longer than the center wavelength of the WDM signal band.

Figure 12:
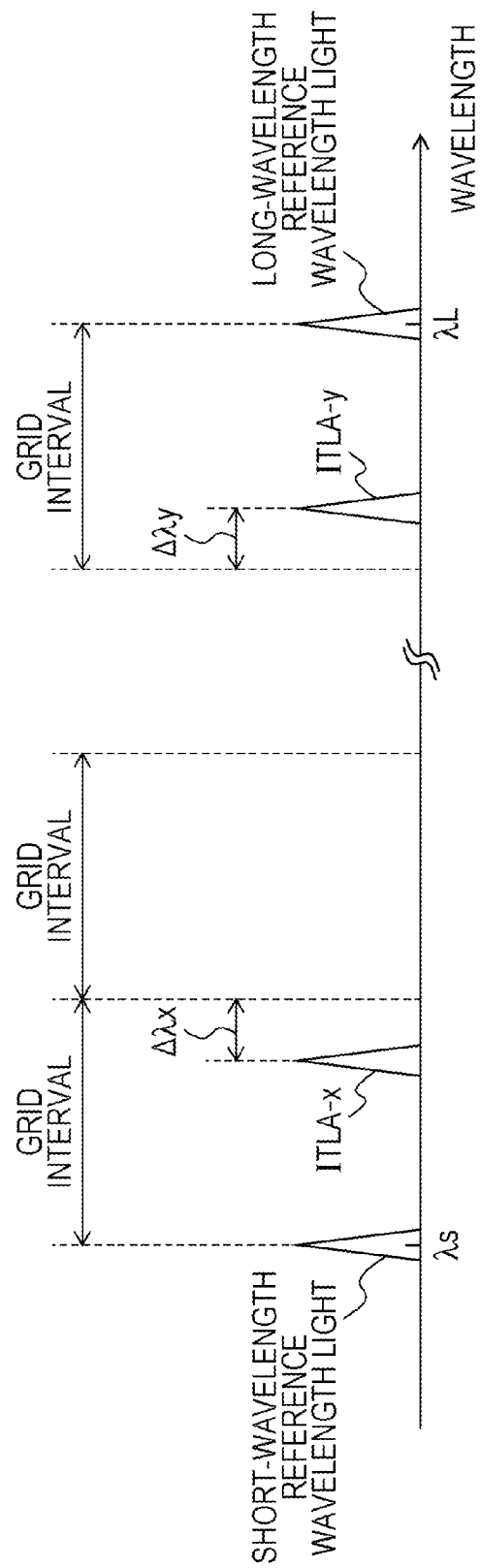
FIG. 12 is a diagram illustrating an example of a method for calibrating a wavelength-variable light source by using a reference wavelength light.

FIG. 12 is a diagram illustrating an example of a method for calibrating the wavelength-variable light source by using a set of reference wavelength light. The light transmission circuit 10 generates the wavelength grid based on the wavelength λs of the short-wavelength reference wavelength light and the wavelength λL of the long-wavelength reference wavelength light. For example, when the WDM transmission system uses an ITU-T frequency grid of 50 GHz intervals, a wavelength grid is generated by dividing a region between the wavelength λs and the wavelength λL at 50 GHz intervals.

The control circuit 17 can calibrate each wavelength-variable laser light source 11 by using the wavelength grid. For example, the control circuit 17 calibrates the wavelength-variable laser light source 11 so that the wavelength of the light output from the wavelength-variable laser light source 11 is disposed on a corresponding wavelength grid. In the example illustrated in FIG. 12, the wavelength-variable laser light source ITLA-x is calibrated so that the wavelength of the output light is shifted by Δλx. In the same manner, the wavelength-variable laser light source ITLA-y is calibrated so that the wavelength of the output light is shifted by Δλy.

As described above, in the optical network system 100 of the embodiment, the wavelength-variable laser light sources 11 of the light transmission circuit 10 of each node are calibrated in order from the wavelength-variable laser light sources 11 of the stable transmission device. Therefore, there is a risk that the calibration error is large in a node where the number of hops from the stable transmission device is large. Therefore, the optical network system 100 has a function to estimate the maximum value of the calibration error.

It is considered that the calibration error is maximum in a node where the number of hops from the stable transmission device is the largest. In the description below, the node where the number of hops from the stable transmission device is the largest may be referred to as a "final node". The final node is determined by the topology of the optical network system 100. For example, in the example illustrated in FIG. 1, the stable transmission device is provided in the node S, so that the node c is the final node. In this case, the transmission device c is provided with information indicating that the node c is the final node. In other words, the transmission device c recognizes that the transmission device c is disposed in the final node.

The operation of the light transmission circuit 10 of the final node is similar to the processing of the flowchart illustrated in FIG. 8. However, in the light transmission circuit 10 of the final node, a vacant channel between the final node and the stable transmission device is searched for in S15. Alternatively, the network management system 200 may search for a vacant channel and the network management system 200 may notify the light transmission circuit 10 of the vacant channel as vacant channel information. In S19, the reference wavelength light is transmitted to the stable transmission device. In other words, the reference wavelength light is transmitted from the final node to the stable transmission device. At this time, the reference wavelength light transmitted from the final node is transmitted, for example, in a reverse direction through the same route as that used when the reference wavelength light is transmitted from the stable transmission device to the final node.

Figure 13:
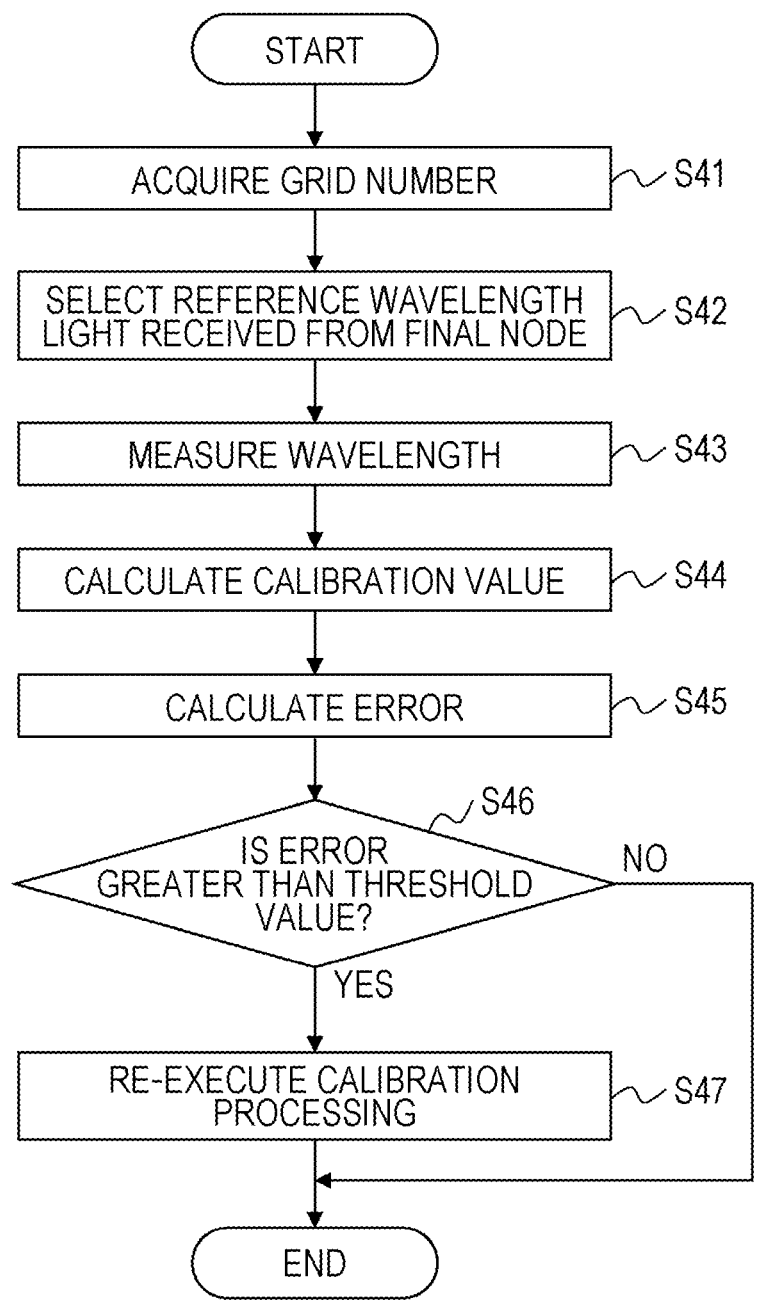
FIG. 13 is a flowchart illustrating processing for estimating a calibration error.

FIG. 13 is a flowchart illustrating processing for estimating the calibration error of the optical network system 100. The processing of this flowchart is performed by the light transmission circuit 20 of the stable transmission device. The processing of this flowchart is performed when the reference wavelength light is transmitted from the final node to the stable transmission device.

The light transmission circuit 20 of the stable transmission device previously performs the processing of the flowchart illustrated in FIG. 7. The light transmission circuit 20 holds the calibration value generated by using the reference wavelength light of the wavelength stabilized light source 21. The light transmission circuit 20 receives the reference wavelength light transmitted from the final node.

The processing of S41 to S43 are substantially the same as that of S11 to S13 described above. In other words, the light transmission circuit 20 measures the wavelength of the reference wavelength light. However, in S41, the light transmission circuit 20 acquires the grid number of the reference wavelength light transmitted from the final node to the stable transmission device. Further, in S42 and S43, the light transmission circuit 20 measures the wavelength of the reference wavelength light received from the final node.

In S44, the control circuit 17 of the light transmission circuit 20 calculates a calibration value based on the measurement result in S43. Specifically, the control circuit 17 obtains the calibration value by calculating a difference between the wavelength corresponding to the grid number acquired in S41 and the measurement result in S43. In S45, the control circuit 17 calculates a calibration error representing a difference between the calibration value generated by using the reference wavelength light of the wavelength stabilized light source 21 and the calibration value calculated in S44. In S46, the control circuit 17 compares the calibration error with a threshold value specified in advance.

Here, the calibration error calculated in S45 can be considered to the maximum value of the calibration error generated in the optical network system 100. Therefore, when the calibration error is smaller than or equal to a predetermined threshold value, it is determined that the calibration error is within an allowable range in all the nodes in the optical network system 100. Therefore, when the calibration error is smaller than or equal to the threshold value, the processing of the control circuit 17 ends.

On the other hand, when the calibration error is greater than the threshold value, the control circuit 17 of the light transmission circuit 20 re-executes the calibration processing in S47. At this time, the control circuit 17 notifies each node in the optical network system 100 of the re-execution of the calibration operation through the network management system 200. Thereafter, the light transmission circuit 20 of the stable transmission device performs the processing of the flowchart illustrated in FIG. 7 and the light transmission circuit 10 of the other nodes performs the processing of the flowchart illustrated in FIG. 8.

When the calibration error is greater than the threshold value, the optical network system 100 may perform other processing. As described above, the reference wavelength light transmitted from the final node to the stable transmission device is transmitted in the reverse direction through the same route as that used when the reference wavelength light is transmitted from the stable transmission device to the final node. In this case, each node on this route receives the reference wavelength light transmitted from the stable transmission device to the final node and also receives the reference wavelength light transmitted from the final node to the stable transmission device. Therefore, the light transmission circuit 10 of each node can obtain the calibration value based on the reference wavelength light transmitted from the stable transmission device to the final node and the calibration value based on the reference wavelength light transmitted from the final node to the stable transmission device. The light transmission circuit 10 of each node may calibrate the wavelength measuring device 16 and the wavelength-variable laser light sources 11 in the light transmission circuit 10 by using an average of the two calibration values.

Figure 14:
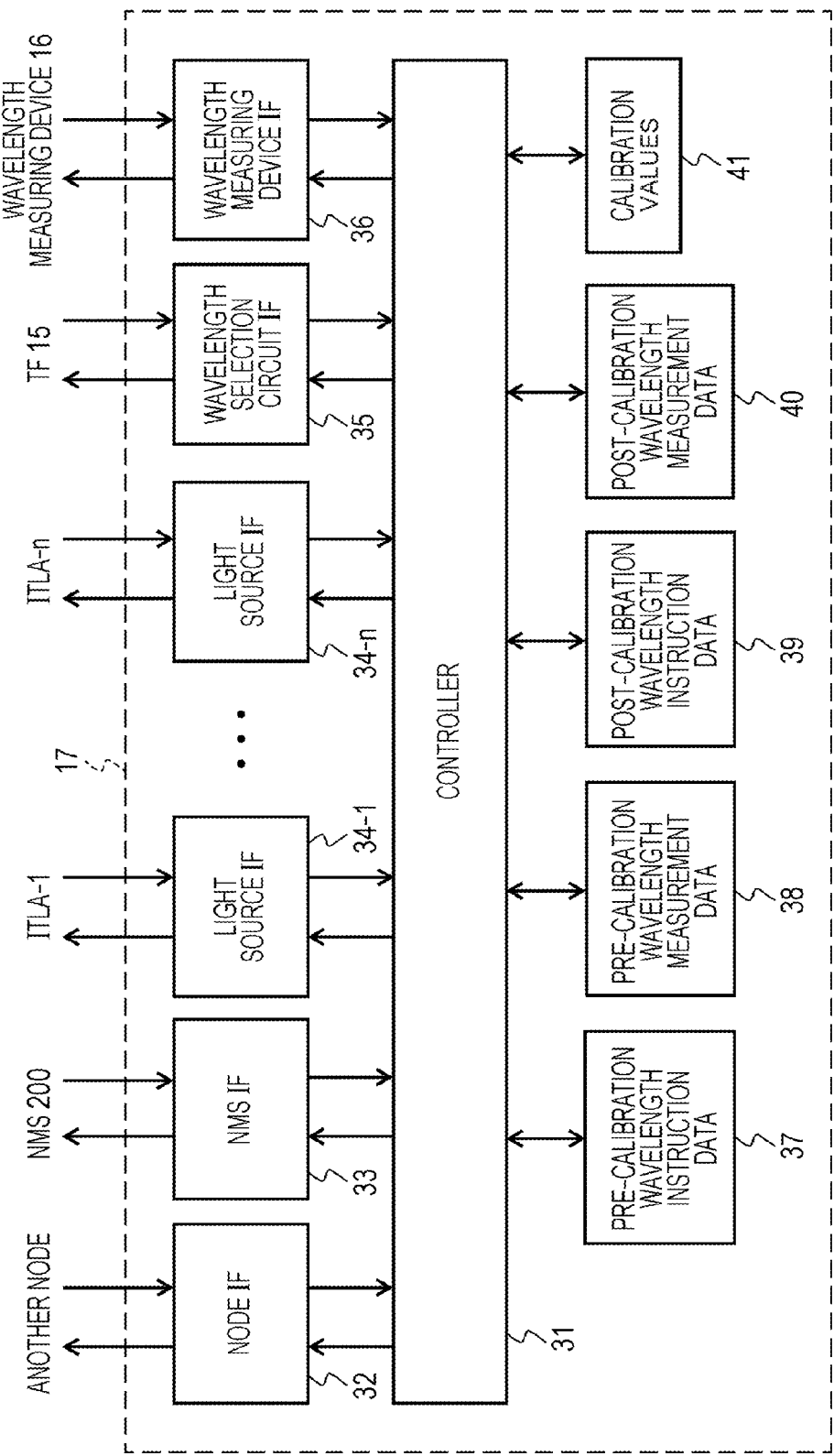
FIG. 14 is a diagram illustrating an example of a configuration of a control circuit mounted on a light transmission circuit.

FIG. 14 illustrates an example of a configuration of the control circuit 17 mounted on the light transmission circuit 10 or the light transmission circuit 20. The control circuit 17 includes a controller 31, a node IF 32, an NMSIF 33, a plurality of light source IFs 34 (34-1 to 34-n), a wavelength selection circuit IF 35, and a wavelength measuring device IF 36.

The controller 31 can perform the processing of the flowcharts illustrated in FIGS. 7 to 10 and 13. Further, the controller 31 can transmit an instruction or data to a corresponding device through each interface (32 to 36) and can acquire information from a corresponding device through each interface. The controller 31 is realized by, for example, a processor. In this case, the controller 31 performs the processing of the flowcharts illustrated in FIGS. 7 to 10 and 13 by executing a given program.

The node IF 32 provides an interface with the transmission device provided in another node. The NMSIF 33 provides an interface with the network management system 200. The light source IFs 34-1 to 34-$n$ provide interfaces with the wavelength-variable laser light sources (ITLA-1 to ITLA-n) 11. The wavelength selection circuit IF 35 provides an interface with the variable optical filter 15 (the light switch 18 in the configuration illustrated in FIG. 4). The wavelength measuring device IF 36 provides an interface with the wavelength measuring device 16.

The control circuit 17 includes a memory. Various data and information are stored in the memory.

In a pre-calibration wavelength instruction data storage unit 37, pre-calibration wavelength instruction data is stored for each wavelength-variable laser light source 11. The pre-calibration wavelength instruction data represents a wavelength instruction which is given to the wavelength-variable laser light source 11 before the wavelength measuring device 16 and the wavelength-variable laser light source 11 are calibrated. In a pre-calibration wavelength measurement data storage unit 38, pre-calibration wavelength measurement data is stored for each wavelength-variable laser light source 11. The pre-calibration wavelength measurement data represents a wavelength of the light which is output from the wavelength-variable laser light source 11 and which is measured before the wavelength measuring device 16 and the wavelength-variable laser light source 11 are calibrated. In a post-calibration wavelength instruction data storage unit 39, post-calibration wavelength instruction data is stored for each wavelength-variable laser light source 11. The post-calibration wavelength instruction data represents a wavelength instruction which is given to the wavelength-variable laser light source 11 after the wavelength measuring device 16 and the wavelength-variable laser light source 11 are calibrated. In a post-calibration wavelength measurement data storage unit 40, post-calibration wavelength measurement data is stored for each wavelength-variable laser light source 11. The post-calibration wavelength measurement data represents a wavelength of the light which is output from the wavelength-variable laser light source 11 and which is measured after the wavelength measuring device 16 and the wavelength-variable laser light source 11 are calibrated. In a calibration value storage unit 41, a calibration value for calibrating the wavelength measuring device 16 is stored. When the light transmission circuit 10 receives the reference wavelength light through each of a plurality of paths, the calibration value, the post-calibration wavelength instruction data, and the post-calibration wavelength measurement data are stored for each path.

Another Embodiment

Figure 15:
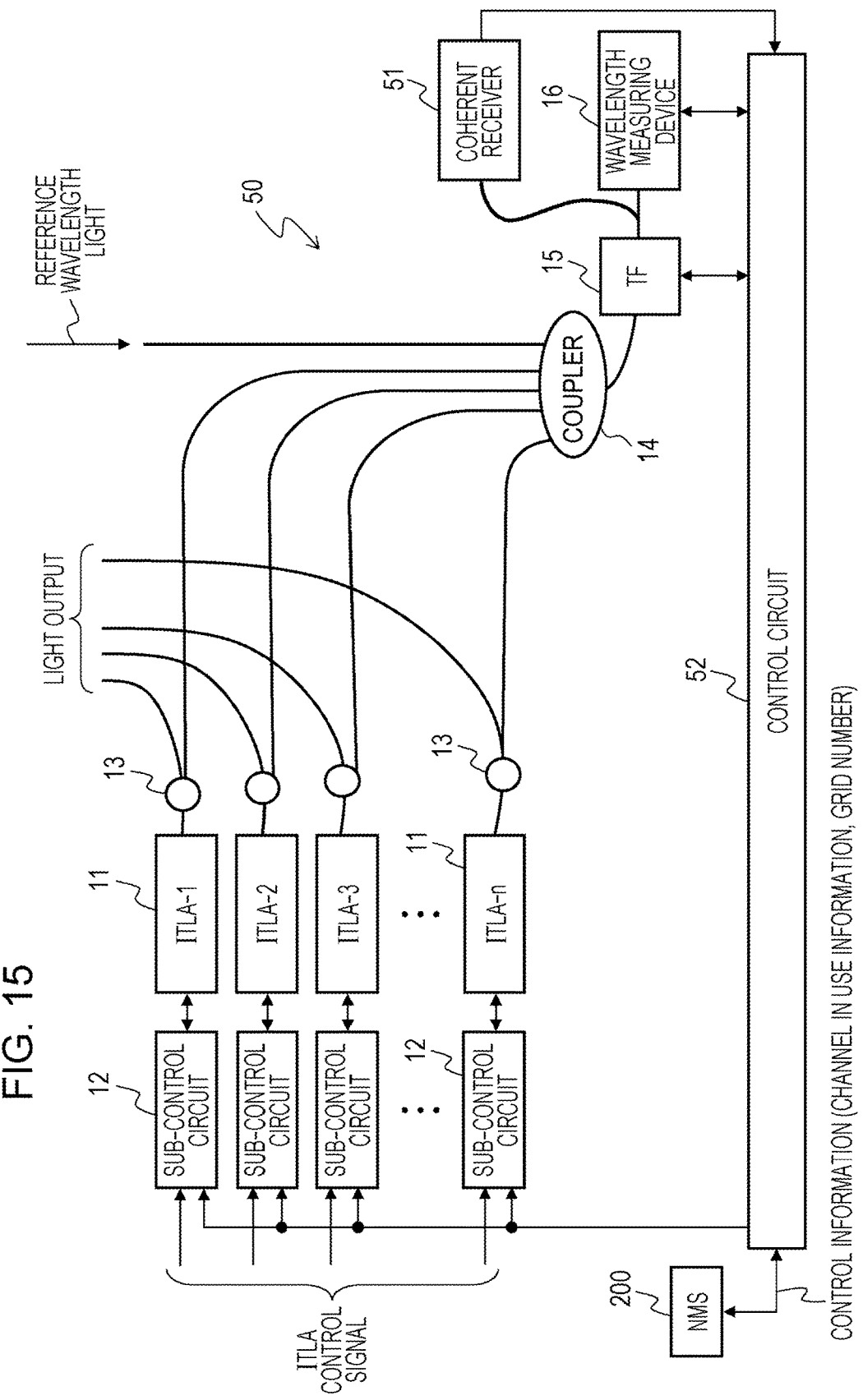
FIG. 15 is a diagram illustrating an example of a light transmission circuit according to another embodiment.

FIG. 15 illustrates an example of a light transmission circuit 50 according to another embodiment. The configuration of the light transmission circuit 50 is substantially the same as that of the light transmission circuit 10 described above. However, as illustrated in FIG. 15, the light transmission circuit 50 is connected to a coherent receiver 51.

The coherent receiver 51 is mounted in the light transmission circuit of the transmission device. The coherent receiver 51 can generate a signal that represents intensity and phase of a received light signal. Here, in this embodiment, the light signal transmits a super-channel signal (or Nyquist channel signal). In this case, the coherent receiver 51 executes an FFT calculation on a received signal in a time domain and generates a frequency domain signal in digital signal processing at an electrical signal level.

A control circuit 52 acquires the frequency domain signal generated by the coherent receiver 51. Then, the control circuit 52 detects a frequency of the reference wavelength light based on the frequency domain signal.

On the other hand, the control circuit 52 performs the processing of the flowchart illustrated in FIG. 8 in the same manner as the control circuit 17 of the light transmission circuit 10. However, when the control circuit 52 calibrates the wavelength measuring device 16, the control circuit 52 refers to a frequency (that is, a wavelength) detected based on an output signal of the coherent receiver 51. For example, the control circuit 52 may calculate a calibration value based on a difference between the wavelength detected based on the output signal of the coherent receiver 51 and the wavelength measured by the wavelength measuring device 16. In this case, the control circuit 52 does not have to perform the processing to acquire the grid number in S11.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device, comprising:
a wavelength-variable light source;
a wavelength stabilized light source:
a wavelength measuring device;
a control circuit that controls the wavelength-variable light source; and
a reception circuit that receives second reference wavelength light generated based on first reference wavelength light output from the wavelength stabilized light source whose wavelength stability is higher than that of the wavelength-variable light source, the control circuit calibrating the wavelength measuring device by using the second reference wavelength light, the control circuit calibrating the wavelength-variable light source by using the calibrated wavelength measuring device.

2. An optical network system, comprising:
a first transmission device; and
a second transmission device that is connected to the first transmission device through an optical transmission path,
wherein the first transmission device includes
a first wavelength-variable light source,
a first wavelength measuring device, and
a first control circuit that controls the first wavelength-variable light source,
the second transmission device includes
a second wavelength-variable light source,
a second wavelength measuring device,
a wavelength stabilized light source whose wavelength stability is higher than that of the first wavelength-variable light source and the second wavelength-variable light source, and a second control circuit controls the second wavelength-variable light source, the second control circuit calibrates the second wavelength measuring device by using light of a first wavelength generated by the wavelength stabilized light source, the second control circuit calibrates the second wavelength-variable light source by using the calibrated second wavelength measuring device, the second control circuit causes the calibrated second wavelength-variable light source to output light of a second wavelength that is not used for communication between the first transmission device and the second transmission device, the first control circuit calibrates the first wavelength measuring device by using the light of the second wavelength output from the second transmission device, and the first control circuit calibrates the first wavelength-variable light source by using the calibrated first wavelength measuring device.

3. The optical network system according to claim 2, wherein the first control circuit causes the calibrated first wavelength-variable light source to output light of a third wavelength that is not used for communication between the first transmission device and a third transmission device, and the first transmission device transmits the light of the third wavelength generated by the calibrated first wavelength-variable light source to the third transmission device.

4. The optical network system according to claim 2, wherein when the second wavelength is not used for communication between the first transmission device and a third transmission device, the first transmission device guides the light of the second wavelength received from the second transmission device to the third transmission device.

5. The optical network system according to claim 2, wherein when the second transmission device receives light of a fifth wavelength from a fifth transmission device, the second control circuit calculates a calibration error of the optical network system based on a measurement result when a wavelength of the light of the fifth wavelength is measured by the second wavelength measuring device and a measurement result when a wavelength of the light of the first wavelength is measured by the second wavelength measuring device.

6. The optical network system according to claim 5, wherein the fifth transmission device is provided in a node where the number of hops from the second transmission device is greatest in the optical network system.

7. The optical network system according to claim 5, wherein when the calibration error is greater than a predetermined threshold value, the wavelength measuring device and the wavelength-variable light source are calibrated again in each transmission device.

8. The optical network system according to claim 5, wherein when the calibration error is greater than a predetermined threshold value, in each node on a path between the second transmission device and the fifth transmission device, the wavelength measuring device and the wavelength-variable light source are calibrated based on light transmitted from the second transmission device to the fifth transmission device and light transmitted from the fifth transmission device to the second transmission device.

9. The optical network system according to claim 2, wherein a wavelength measuring device of a transmission device that is connected by a transmission path to a plurality of calibrated transmission devices which are calibrated through one or a plurality of transmission devices from the second transmission device is calibrated by using a plurality of light output from the plurality of calibrated transmission devices.

10. The optical network system according to claim 2, wherein the first transmission device further includes a coherent receiver that executes FFT on a received light signal and generates a frequency domain signal, and the first control circuit calibrates the first wavelength measuring device by using the light of the second wavelength output from the second transmission device and the frequency domain signal.

11. The optical network system according to claim 2, wherein when a vacant channel has not been searched by the control circuit, the control circuit assigns a narrow bandwidth channel where a wavelength is set in an end wavelength region of a transmission wavelength band of the optical communication system.

* * * * *